United States Patent [19]

Missio et al.

[11] Patent Number: 4,515,025
[45] Date of Patent: May 7, 1985

[54] APPARATUS FOR DRIVING TAKE-UP ELEMENTS FOR PALLETIZABLE LOAD UNITS

[75] Inventors: Bruno Missio, Moncalieri; Angelo Giorgioni, Turin, both of Italy

[73] Assignee: Girogioni di A. Giorgioni & C. s.a.s., Turin, Italy

[21] Appl. No.: 416,423

[22] Filed: Sep. 9, 1982

[30] Foreign Application Priority Data

Sep. 28, 1981 [IT] Italy ................... 68248 A/81

[51] Int. Cl.³ ................. F16H 21/16; B65G 25/04
[52] U.S. Cl. ............................. 74/27; 74/52; 414/668; 198/488
[58] Field of Search .............. 74/27, 52; 414/282, 414/283, 662, 664, 665, 666, 668, 786; 198/488

[56] References Cited

U.S. PATENT DOCUMENTS

| | | | |
|---|---|---|---|
| 1,452,038 | 4/1923 | Goldschmidt | 74/52 X |
| 3,106,305 | 10/1963 | Gehring | 414/666 |
| 3,167,201 | 1/1965 | Quayle | 414/664 |
| 3,363,474 | 1/1968 | Ritter et al. | 74/52 |
| 3,401,568 | 9/1968 | Blatt | 74/52 X |
| 3,437,223 | 4/1969 | Haase | 414/662 X |
| 3,719,270 | 3/1973 | Budris et al. | 198/488 X |
| 3,732,966 | 5/1973 | Treiber | 198/488 X |

FOREIGN PATENT DOCUMENTS

| | | | |
|---|---|---|---|
| 1113891 | 12/1981 | Canada | 414/662 |
| 0021805 | 1/1980 | European Pat. Off. | 414/662 |
| 2308487 | 8/1973 | Fed. Rep. of Germany | 414/666 |
| 54335 | 12/1948 | France | 74/52 |
| 1417126 | 12/1975 | United Kingdom | 414/664 |
| 1473559 | 5/1977 | United Kingdom | 414/666 |

Primary Examiner—Rodney H. Bonck
Assistant Examiner—David D. House
Attorney, Agent, or Firm—Sughrue, Mion, Zinn, Macpeak, and Seas

[57] ABSTRACT

Apparatus (1) for driving take-up elements (7) for palletizable load units (4), which are intended to effect cycles of movement each including at least a first and a second horizontal movement in opposite directions from each other, with a vertical movement in between. These movements are driven so as to follow each other without intermediate stoppages and with a continuous and substantially harmonic variation of the velocity and acceleration of the take-up elements (7). The apparatus (1) includes a linkage (10, 12) interposed between the take-up elements (7) and the motor (13) for driving their horizontal movement, and cam means (24, 25) driven by the motor (13) for driving the vertical movement.

2 Claims, 18 Drawing Figures

APPARATUS FOR DRIVING TAKE-UP ELEMENTS FOR PALLETIZABLE LOAD UNITS

The present invention relates to a method for driving take-up elements for palletizable load units, which are intended to carry out cycles of movement each including at least a first and a second horizontal movement in opposite directions from each other, with a vertical movement in between.

In the present specification, and in the claims that follow, the term "palletizable load unit" refers to any object (for example, a container, a support platform, or any article of defined form) having a lower surface which allows the insertion thereunder of "take-up elements" (such as, for example, slides, forks, or platforms) for transferring the load unit.

This type of movement of materials is adopted, for example, in transport, storage, temporary storage, and production installations in which the load units are supported on a fixed structure (for example, shelving or a storage bench), while the take-up elements are carried by a movable structure (for example, a distribution trolley or a translator-elevator device) and allow the load units to be set down on the fixed structure or the load units to be picked up from the fixed structure. There are also installations in which the take-up elements are carried by a fixed structure and the load units are supported on a movable structure which can be moved into correspondence with the fixed structure.

In order to pick up a load unit, the take-up elements effect a first horizontal extending movement so as to be moved beneath the lower surface of the palletizable load unit, a vertical lifting movement to lift the load unit from its rest plane, and a second horizontal withdrawing movement to move the load unit above the structure which carries the take-up elements.

In order to set down a load unit on a structure for receiving it, the take-up elements carry out the reverse cycle of movement, including a first horizontal extending movement, a vertical lowering movement which allows the load unit to be brought into contact with the rest plane, and a second horizontal withdrawing movement.

Thus, the take-up elements, in the case of both the picking up and setting down of a load unit, perform a cycle of movements each comprising a first and a second horizontal movement in opposite directions, with a vertical movement in between.

In known installations of the type described above, the movements of the take-up elements are driven by electric motors and controlled by relatively complicated electronic or electrical apparatus, including a series of travel limit sensors arranged to provide slowing signals close to the end of the first horizontal movement, stoppage of this movement, starting of the vertical movement, stoppage of the vertical movement, starting of the second horizontal movement, slowing close to the end of this movement, and stoppage in the final position.

The known installations thus have dead times between the three movements in each cycle of movement of the take-up elements, consequently causing an increase in the total time for the movements.

The object of the present invention is to provide a method for driving the take-up elements which allows the total time for the movements to be reduced, compared with known installations, by simple means and without introducing any risk of instability of the material being moved.

The main characteristic of the method according to the invention lies in the fact that the three movements defining each cycle of movement of the take-up elements are driven so as to follow each other without intermediate stoppages and with a continuous and substantially harmonic variation of the velocity and acceleration of the take-up elements.

According to a further aspect, the invention also relates to apparatus for performing the aforesaid method.

The known installations, in addition to their complexity and the high cost of the electronic or electrical control apparatus described above, also have the disadvantage of not ensuring precise positioning of the load because of the displacements to which these devices (more precisely, the travel limiters) may be subject during operation of the installations.

In order to avoid these disadvantages, the present invention provides apparatus for driving the take-up elements for palletizable load units, which are intended to carry out cycles of movement each comprising at least a first and a second horizontal movement in opposite directions to each other, with a vertical movement in between, this apparatus including a motor, guide means for the horizontal movement of the take-up elements, a mechanical transmission connected between the motor and the take-up elements for driving the horizontal movement of the latter, and means for driving the vertical movement, characterised in that:

the mechanical transmission connected between the motor and the take-up elements is constituted by a linkage including a crank driven by the motor and a connecting rod of substantially the same length as the crank, which is articulated at one end to the crank and at the other end to a part fixed to the take-up elements, and the means for driving the vertical movement of the take-up elements comprise cam means driven by the motor and arranged to operate close to the end of the first horizontal movement to cause a continuous variation in the velocity and acceleration of the take-up elements during the vertical movement, whereby the operation of the motor effects the three movements in succession without intermediate stoppages and with a continuous and substantially harmonic variation in the velocity and acceleration of the take-up elements.

Further characteristics and advantages of the present invention will emerge from the description which follows with reference to the appended drawings, provided purely by way of non-limiting example, in which.

Figure 1:
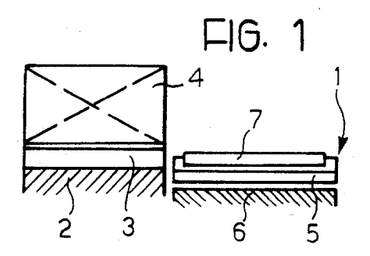
FIGS. 1 to 5 illustrate schematically an installation using apparatus according to the invention in its different stages of operation.

FIG. 1 illustrates schematically an installation using apparatus according to the present invention, generally indicated 1, and a structure 2 on which is located a palletizable platform 3 which, in its turn, supports a load 4.

Figure 2:
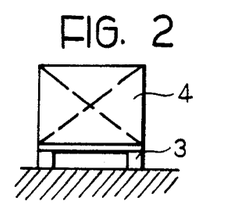
Figures 3, 4, 5, 10:
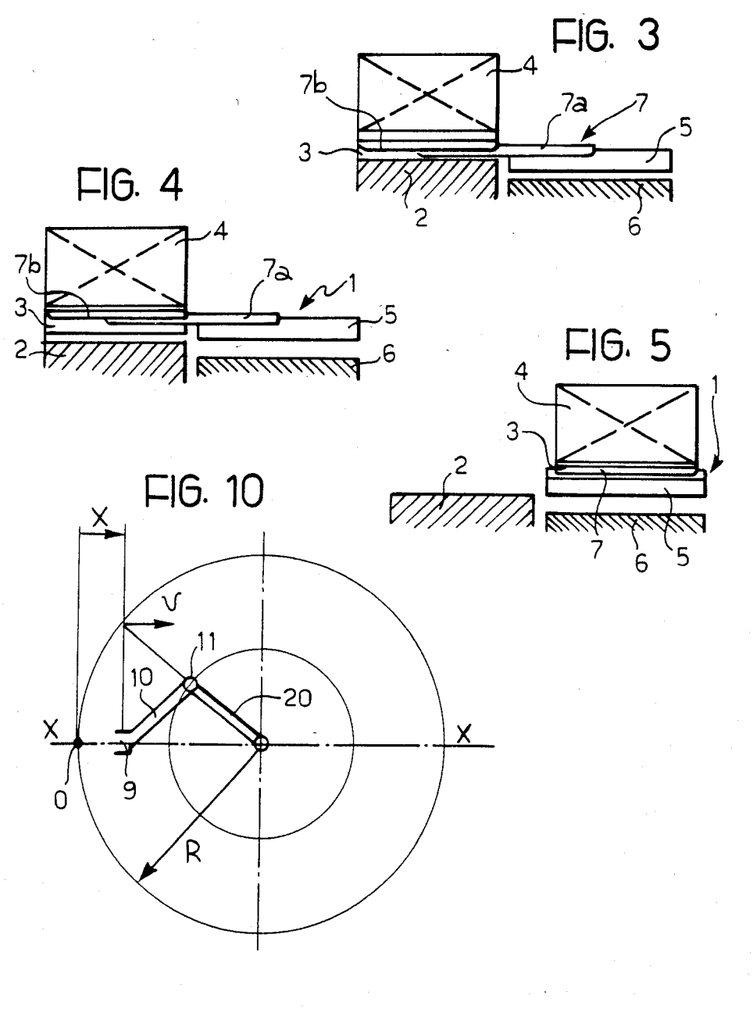
FIGS. 10 and 11 illustrate the operating principle of the apparatus according to the invention.

FIG. 2 is a front elevational view of the palletizable platform 3 and the load 4. FIGS. 3 to 5 illustrate the different stages in a pick-up operation whereby the palletizable platform 3 and the load 4 supported thereon are transferred from the structure 2 to a position above the apparatus 1.

This apparatus includes a frame 5 which is movable vertically between a lowered position and a raised position relative to a reference structure 6, and take-up elements 7 movable horizontally relative to the frame 5. The structure of the frame 5, the take-up elements 7, and the means for effecting their movement will be described in detail below.

FIG. 1 illustrates the apparatus 1 in the initial condition in which the frame 5 is in its lowered position and the take-up elements 7 are in a withdrawn position overlying the frame 5.

In order to pick up the palletizable platform 3, the take-up elements 7 are driven so as to effect a first horizontal extending movement which carries these elements beneath the lower surface of the palletizable platform 3. FIGS. 1 to 5 illustrate, by way of example, the case in which the take-up elements 7 are constituted by a pair of telescopic forks each including an element 7a displaceable horizontally relative to the frame 5, and an element 7b displaceable horizontally relative to the element 7a (see FIGS. 3 and 4 in particular). The frame 5 is thus displaced vertically into its raised position, so as to move the apparatus 1 into the position shown in FIG. 4. This causes the raising of the palletizable platform 3 by the elements 7b of the pair of forks constituting the take-up elements 7. Once the palletizable platform 3 has been raised relative to its rest plane on the structure 2, the take-up elements are driven to effect a second horizontal withdrawing movement so as to carry the palletizable platform 3 and the load 4 above the apparatus 1 (see FIG. 5).

The apparatus according to the present invention allows the cycle of movements of the take-up elements, comprising the first horizontal extending movement, the vertical movement, and the second horizontal withdrawing movement, to be driven without intermediate stoppages and with a continuous and substantially harmonic variation of the velocity and acceleration of the take-up elements 7. Clearly, this also applies to the case of an operation to set down a load unit, in which the cycle of movements is carried out in reverse starting from the position illustrated in FIG. 5 and going to that illustrated in FIG. 1, and includes a first horizontal extending movement, a vertical lowering movement, and a second horizontal withdrawing movement.

FIGS. 6 to 9 illustrate a first preferred embodiment of the apparatus 1. These Figures also relate, by way of example, to the case in which the take-up elements 7 are constituted by a pair of telescopic forks each of which includes the two elements 7a, 7b. The drawings show the means for driving the horizontal movement of the elements 7a of the forks, but the means for driving the horizontal elements 7b relative to the elements 7a are not shown, since these drive means are conventional.

The two elements 7a of the forks constituting the take-up elements 7 are connected by a cross member 8 to the centre of which is articulated, about a vertical axis 9, one end of a connecting rod 10 the opposite end of which is articulated, also about a vertical axis 11, to a gear wheel 12 with a vertical axis, which is driven by an electric motor 13 through a train of gears 14, 15, 16. On the gear wheel 12 is mounted coaxially a gear wheel 17 which is freely rotatable relative to the wheel 12 and meshes, with the interpositioning of a gear wheel 18, with a gear wheel 19 carried by the connecting rod 10 in coincidence with the axis 11 of articulation. The distance between the axes 9, 11 is equal to the distant between the axis 11 and the axis of the gear wheel 12. Furthermore, the diameter of the gear wheel 17 is twice the diameter of the gear wheel 19.

By virtue of this characteristic, the end of the connecting rod 10 connected to the cross member 8 is displaced horizontally along the axis of symmetry (indicated X—X in FIG. 8) of the apparatus with a harmonic motion. This is clearly seen from FIGS. 10 and 11 which illustrate respectively a schematization of the kinematic mechanism including the gear wheel 12 and the connecting rod 10, and graphs of the displacement, the velocity, and the acceleration of the motion of the end of the connecting rod 10 connected to the cross member 8.

As illustrated in FIG. 10, the kinematic mechanism including the gear wheel 12 and the connecting rod 10 is comparable to a linkage including a crank 20 of qmparable to a linkage including a crank 20 of the same length as the connecting rod 10, which is rotated at a constant velocity V by the motor 13 and has its free end articulated at axis 11 to the opposite end of the connecting rod 10 from the cross member 8.

Except in some particular conditions of operation which will be discussed below, the gear wheel 17 is fixed and the coupling of this wheel with the gear wheel 19 through the wheel 18 ensures that the end of the connecting rod 10 connected to the cross member 8 is displaced along the axis X—X with harmonic motion. With reference to FIG. 10, assuming that the crank rotates in a clockwise direction with a constant angular velocity, the connecting rod 10 rotates about the axis 11 relative to the crank 20 in an anti-clockwise direction with twice the angular velocity. FIG. 10 also illustrates a concentric circle with twice the radius of the circle described by the axis 11 of the crank 20. By virtue of this characteristic, the axis 9 of the rod 10 is always in correspondence with a projection along the axis X—X of the intersection of the elongation of the crank 20 with the circle of radius R.

Figure 11:
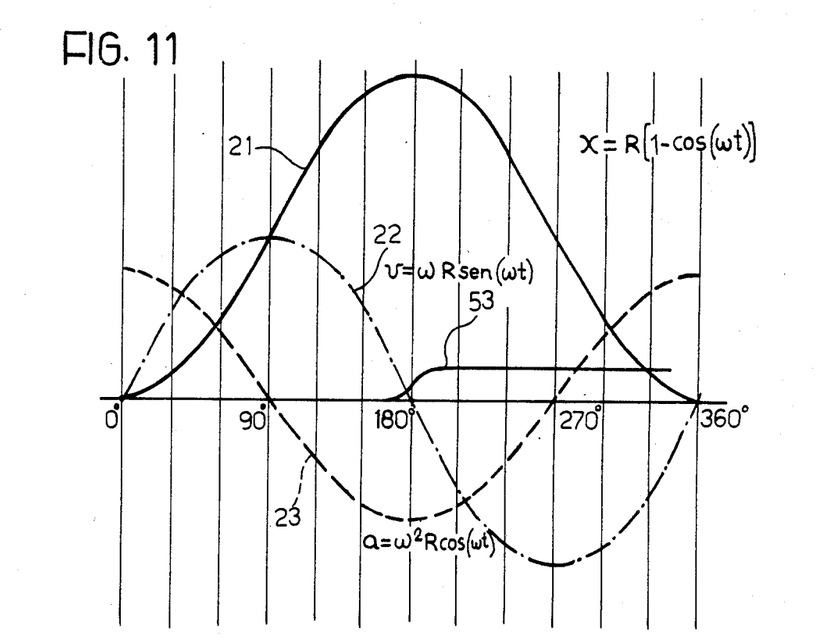

FIG. 11 illustrates as 21, 22, 23 respectively the laws of the displacement X measured from the origin 0 indicated in FIG. 10, of the velocity, and of the acceleration of the axis 9 of the rod 10.

The fact that the take-up elements 7 are driven so as to effect a harmonic motion allows the achievement of a high stability of the load supported by the forks, together with a reduced movement time.

The length of the rod 10 may also differ slightly from that of the crank 20. Thus, it is possible, by changing the length of the rod, to arrange the apparatus to carry out horizontal movements of any length between the lengths of the movements obtainable by using two trains of gear wheels 17, 18, 19 of successive sizes. As a result of this, the law of the motion of the axis 9 of the rod 10 will stray slightly from the vigorously harmonic law and the path of this end will deviate slightly from the axis of symmetry X—X, without thereby influencing appreciably the stability of the load supported by the forks, given the slight degree of this deviation.

In order to drive the vertical displacements of the frame 5 relative to the reference structure 6, a wheel 24 is provided which is rotatable about the axis of rotation of the wheel 12 and is fixed thereto, the periphery of this wheel being cam-shaped to cooperate with a roller 25 carried at one end of a lever 26 the opposite end of which is articulated to the frame 5 about an axis 27. The lever 26 is connected by means of a lever transmission 29, 30 to a tubular element 31 with a horizontal axis. The ends of the tubular element 31 are carried by two levers 32, each of which is articulated at one end to a bracket 33 projecting below the frame 5 and at the opposite end to a support 34 fixed to the reference structure 6. Each bracket 33 is also connected to the corresponding support 34 by means of a connecting rod 35.

The periphery of the wheel 24 has two sections 36, 37 (see FIG. 8) each extending through an angle of about 180°, which have differing constant radii and are connected by two sections 38, 39. When the take-up elements are in their condition of maximum extension illustrated in FIG. 8, the roller 25 of the lever 26 engages the section 38 of the profile of the wheel 24.

The operation of the part of the apparatus according to the invention described above is as follows:

Assuming that the take-up elements 7 are in their position of maximum withdrawal, operation of the motor 13 rotates the gear wheel 12 through the train of gear wheels 14 to 16, and drives the movement of the end of the connecting rod 10 along the axis X—X with the characteristics of velocity and acceleration described above. When the gear wheel 12 has completed a rotation of 180°, the connecting rod 10 is located in the position illustrated in FIG. 8 and the elements 7a of the forks 7 reach their position of maximum extension. At the beginning of the rotation of the gear wheel 12, the roller 25 is engaged with the end of the section 36 adjacent the section 39 of the profile of the cam wheel 24. Immediately before the gear wheel 12 has completed a rotation through 180°, the roller 25 comes into engagement with the section 38 of the profile of the cam wheel 24, causing the vertical displacement of the frame 5 towards its raised position by means of the lever transmission 26, 29, 30, 32. As soon as the rotation through 180° has been completed, the roller 25 engages the section 37 of the profile of the cam wheel 24, which corresponds to the frame 5 reaching the raised position. During the subsequent angular movement of the gear wheel 12 through 180°, the end of the connecting rod 10 is brought to the position corresponding to the maximum withdrawal of the elements 7a of the forks and, at the same time, the roller 25 runs over the section 37 of the profile of the cam wheel 24 relative to this wheel, to reach the end of the section 37 adjacent the section 39. At this point, that is, at the end of a rotation of the gear wheel 12 through 360°, the motor is stopped. In order to carry out the necessary maintenance, the direction of rotation of the motor 13 is reversed to effect a similar rotation of the wheel 12 in the opposite direction. This causes, in a first period, the extension of the elements 7a of the forks followed by a lowering of the frame 5 and a return of the elements 7a towards their position of maximum withdrawal. Thus, the cycles of movement necessary for the operations of picking up and setting down load units, which have been described above with reference to FIGS. 1 to 5, are achieved.

Figure 6:
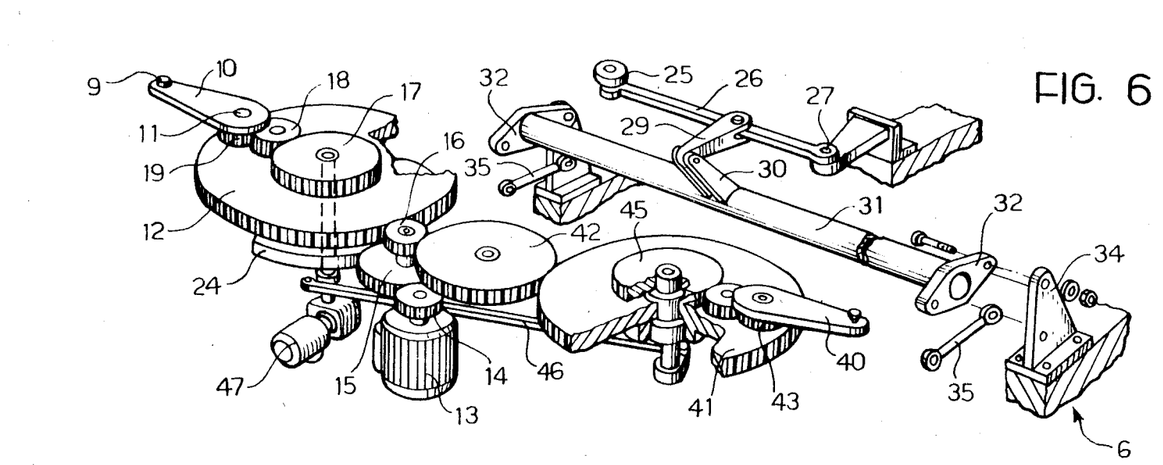
FIG. 6 is an exploded schematic perspective view of a first preferred embodiment of the apparatus according to the present invention.
Figure 7:
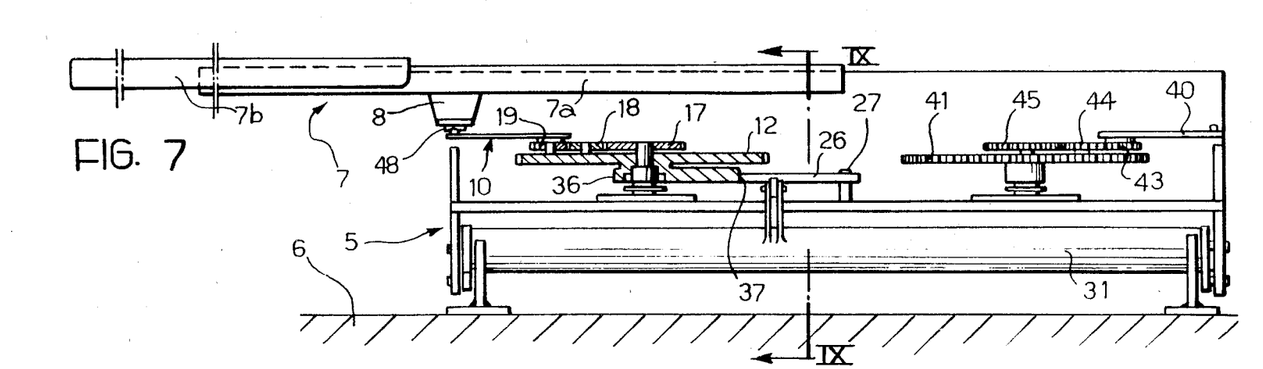
FIGS. 7 to 9 are a side elevational view and a plan view of the apparatus of FIG. 7, and a section taken on line IX—IX of FIG. 7, respectively.
Figure 8:
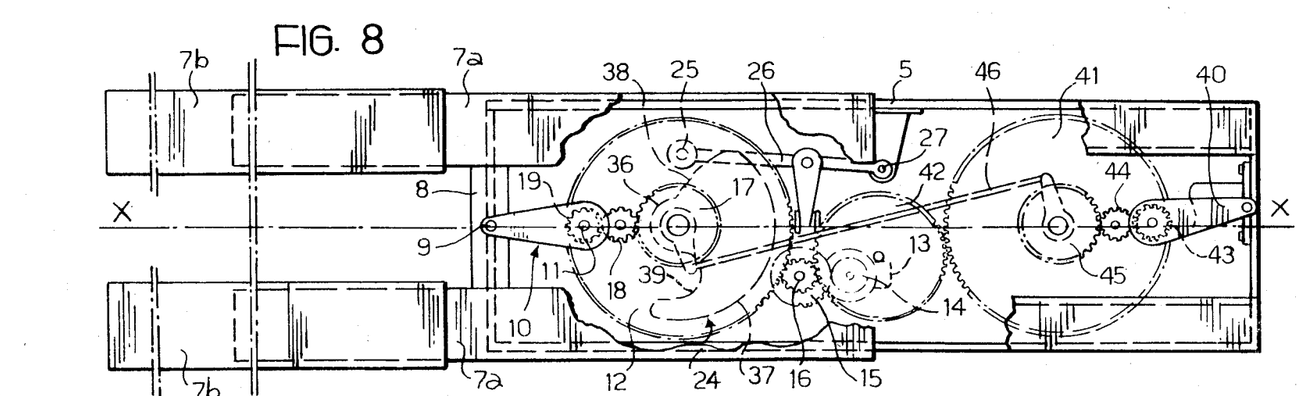
Figure 9:
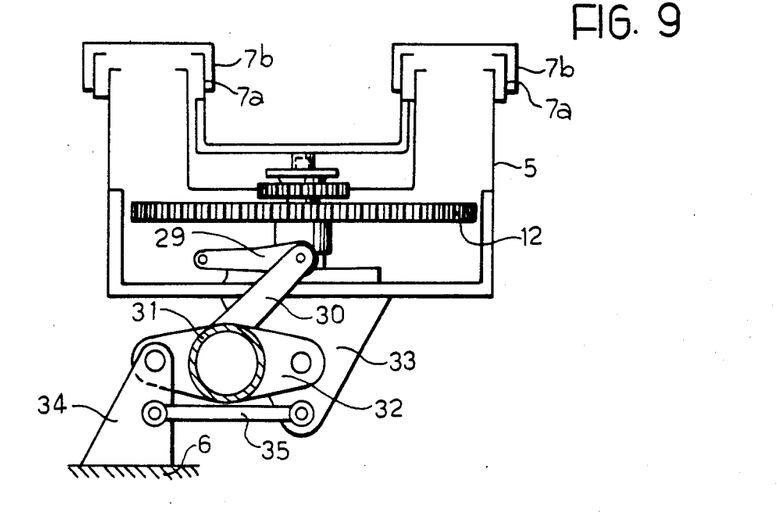

The embodiment illustrated in FIGS. 6 to 8 is provided with means for allowing the forks constituting the take-up elements for the load units to carry out their cycles of movement selectively on opposite sides of the frame 5.

For this purpose, the apparatus 1 includes a further linkage identical to that described above and driven by the motor 13 in synchronism therewith. This further linkage includes a connecting rod 40 which is identical to the connecting rod 10 and is rotatably mounted on a gear wheel 41 similar to the gear wheel 12 driven by the motor 13 through the gear train 14 to 16 and a gear 42. The connecting rod 40 also carries a gear wheel 43 which meshes with a gear wheel 45 with the interposition of a gear wheel 44, and is mounted coaxially on the gear wheel 41 in a freely rotatable manner.

The shafts on which the two gear wheels 17, 45 are fixed are interconnected by a connecting rod 46 (see FIGS. 6 and 8) which allows small angular displacements of the wheel 17 to be transmitted to the wheel 45. The shaft on which this wheel is mounted is rotatable by a low-power auxiliary motor 47.

The cross member 8 is provided at its point of attachment to the connecting rod 10 with a coupling element 48 (see FIG. 7) having a transverse groove (with respect to the horizontal direction of movement of the forks) in which a projection carried by the end of the connecting rod 10 is engaged. A similar projection is also provided on the end of the connecting rod 40. The two rods 10, 40 are aligned in two directions which form a relatively small angle with each other. When the forks are in the position of maximum extension or maximum withdrawal, the rod which engages the coupling element 48 (that is, the rod 10 in the case of FIG. 8) is aligned with the axis of symmetry X—X.

Assuming that the apparatus is in the condition illustrated in FIG. 8, it is possible in this condition to drive the cycle of movement of the forks 7 on the left-hand side of the frame 5 (with reference to FIG. 8).

When it is desired that the forks 7 carry out their cycle of movement on the opposite side, to the right of the frame 5 (with reference to FIG. 8), it is necessary first of all to bring the forks into the position of maximum withdrawal. In this condition, the free end of the rod 40 is brought close to the coupling element 48 within which is engaged the free end of the rod 10. At this point, the gear wheels 19, 43 are rotated through a small angle by means of the auxiliary motor 47 and the gear trains constituted by the gear wheels 17, 18 and 45, 44 respectively, causing the disengagement of the rod 10 from the coupling element 48 and the engagement of the rod 40 in this coupling element. Thus, under these conditions, the forks may be driven by the motor 13 through the linkage constituted by the gear wheel 41 and the connecting rod 40.

When it is desired to change anew the side on which the forks operate, it is again necessary to cause the auxiliary motor 47 to rotate through a small angle, in the opposite direction to that previously, with the forks in their position of maximum withdrawal.

Figure 12:
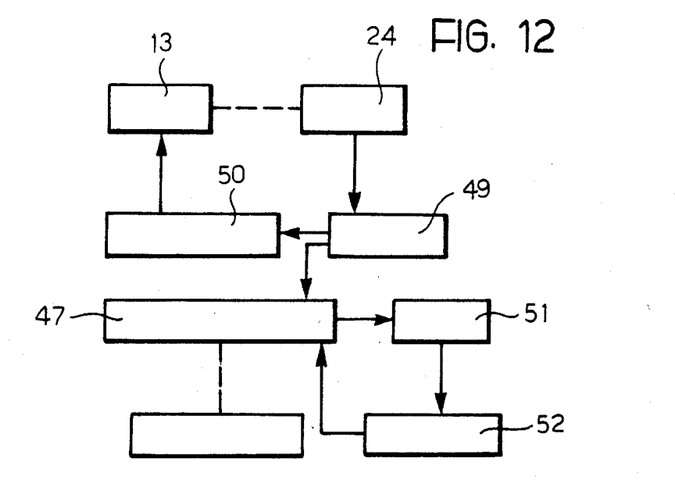
FIG. 12 is a block schematic diagram illustrating a control system for the apparatus according to the invention.

FIG. 12 is a block schematic diagram of the control system for the apparatus described above. This system includes a travel limit sensor 49 arranged to signal the completion of a rotation of the cam wheel 24 through one revolution, so as to allow the direction of rotation of the motor 13 to be reversed by a remote control reverser 50. The travel limit sensor 49 also enables the operation of the auxiliary motor 47, when it is desired to effect the selection of the rods 10, 40 to change the side of operation of the forks. Travel limit sensors 51 are also provided to signal the completion of the small rotation of the auxiliary motor 47 necessary to effect the selection of the rods, so as to enable the reversal of the direction of rotation of the auxiliary motor through a remote control reverser 52.

The apparatus which has been described above may also use a cam wheel 24 having a profile shaped so that a continuous rotation of the motor 13 in the same direction of rotation would cause in succession a first horizontal movement, a first vertical movement, a second horizontal movement in the opposite direction from the first horizontal movement, and a second vertical movement in the opposite direction to the first vertical movement.

Instead of the coupling constituted by the gears 17 to 19 and the corresponding coupling comprising the gears 43 and 45, two chain drives could be used. The apparatus described above allows various advantages to be achieved relative to the apparatus of a similar type made previously.

In the first place, the absence of intermediate stoppages between the various movements constituting the cycle of movement of the take-up elements allows the total time of movement to be minimised.

Furthermore, the harmonic movement of the take-up elements allows the achievement of a greater stability of the load moved. These results are obtained with a structure which is simple and reliable, and does not require the adoption of sophisticated electrical or electronic control systems.

As is clear from the previous description, during a picking up or setting down operation, the vertical movement of the frame 5 starts immediately before the take-up elements have reached their position of maximum extension and stops immediately thereafter. This is also illustrated in the diagram of FIG. 11, in which the vertical movement of the frame 5 in dependence on the angle of rotation of the cam wheel 24 is indicated by 53. As illustrated, this vertical movement is effected in correspondence with a relatively small angle of rotation of about that corresponding to the position of maximum extension of the take-up elements.

By virtue of the advantages mentioned above, the maintenace of the apparatus is also simple, quick, and hence economical.

Figures 13, 14:
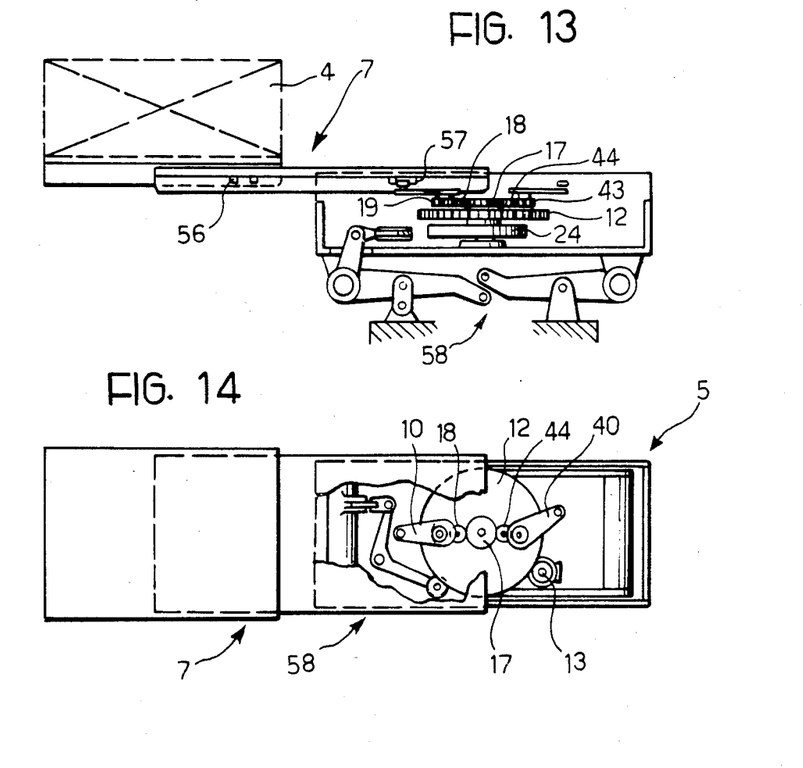
FIGS. 13 to 15 are respectively a side elevational view, a plan view, and a schematic perspective view of a second embodiment of the apparatus according to the invention.
Figure 15:
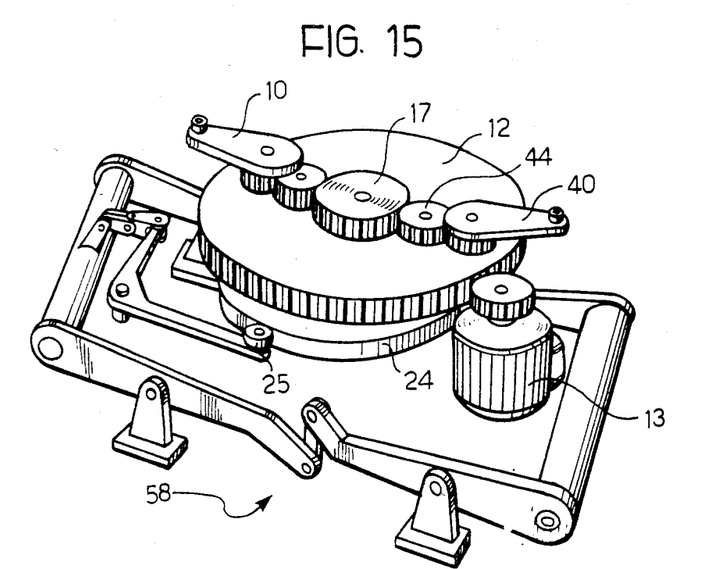

The embodiment illustrated in FIGS. 13 to 15 differs from that described above only in that it has a single gear wheel 12 acting as the crank on which both the rods 10, 40 are articulated in diametrically opposite positions which are symmetrical relative to the axis of rotation of this wheel. Naturally, the gears carried by the two connecting rods are coupled to this single gear wheel 17 which can be driven by means of the auxiliary motor 47. In this case, moreover, the take-up elements are constituted by a telescopic platform provided at the bottom with a pair of coupling elements 56, 57 which are spaced from each other in the direction of horizontal movement of the take-up element 7 and are each arranged to engage selectively the free end of a respective connecting rod. In particular, when the take-up elements must operate on the left-hand side of the frame 5 (with reference to FIG. 14), the coupling element 57 is engaged by the connecting rod 10, while the coupling element 56 is free. When the take-up elements must operate on the right-hand side, the coupling element 56 is engaged by the connecting rod 40 while the coupling element 57 is free. In FIGS. 13 to 15, a lever system, generally indicated 58, is controlled by the cam wheel 24 fixed to the gear wheel 54 and is arranged to drive the vertical displacements of the movable frame 5.

Figure 16:
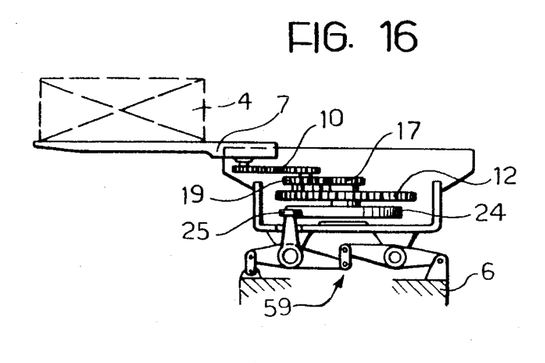
FIGS. 16 to 18 are respectively a side elevational view, a plan view, and a schematic perspective view of a third embodiment of the apparatus according to the invention.
Figure 17:
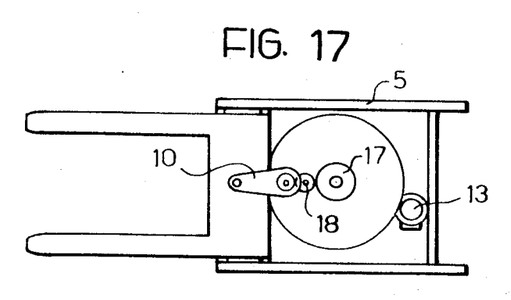
Figure 18:
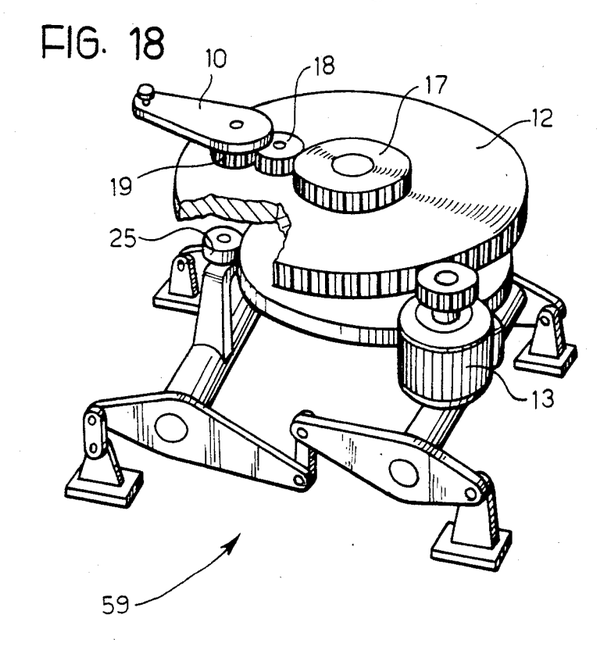

Finally, the embodiment illustrated in FIGS. 16 to 18 relates to the simpler case in which the take-up elements (illustrated, by way of example, as forks) can operate on only one side of the frame 5. In this case, therefore, only the linkage including the connecting rod 10 and the gear system for driving it are necessary. A lever system 59 similar to the lever system 58 is arranged to drive the vertical displacements of the frame 5.

Naturally, while the principle of the invention remains the same, the details of construction and forms of embodiment may be varied widely from that described and illustrated purely by way of example, without thereby departing from the scope of the present invention.

I claim:

1. In an installation for handling palletizable load units with take-up elements adapted to carry out cycles of movement each comprising at least a first horizontal movement, a vertical movement, and a second horizontal movement in an opposite direction to said first movement, apparatus for driving the take-up elements which includes a motor; guide means for the horizontal movement of said take-up elements; a mechanical transmission connected between said motor and said take-up elements for driving the horizontal movements thereof, and means for driving the vertical movement, wherein the improvements consist in:

said mechanical transmission between the motor and the take-up elements being constituted by a linkage including gear means defining a crank mechanism driven by the motor and a connecting rod of substantially the same length as the crank mechanism, which is articulated at one end to the crank mechanism and at the other end to a part moveable with the take-up elements, and said means for driving the vertical movement of the take-up elements comprise cam means driven by the motor and arranged to operate close to the end of the first horizontal movement to cause a continuous variation in the velocity and acceleration of said take-up elements during the vertical movement, whereby the operation of said motor drives said three movements in succession without intermediate stoppages and with a continuous and substantially harmonic variation in the velocity and acceleration of said take-up elements, and wherein said crank mechanism is constituted by a first gear wheel; a pinion driven by said motor meshes with said first gear wheel; a second gear wheel is carried by said end of the connecting rod articulated to said crank mechanism; a third gear wheel coaxial with said first gear wheel; an auxiliary gear wheel freely rotatable on the said first gear wheel is interposed between said third gear wheel and said second gear wheel, the latter having a diameter of half the diameter of said third gear wheel, and an auxiliary motor is provided for rotating said third gear wheel through a limited angle;

said apparatus further including an auxiliary connecting rod articulated to said first gear wheel at a symmectrical point diametrically opposite the point of articulation of the said connecting rod; a pair of coupling elements provided on the take-up elements and spaced from each other in the direction of horizontal movement of the take-up elements, each coupling element being selectively engageable with the free end of a respective said connecting rod; a fourth gear wheel fixed to the end of the auxiliary connecting rod articulated to the first gear wheel and having a diameter equal to that of said second gear wheel, and a further auxiliary gear wheel interposed between said third and fourth gear wheels.

2. In an installation for handling palletizable load units with take-up elements adapted to carry out cycles of movement each comprising at least a first horizontal movement, a vertical movement, and a second horizontal movement in an opposite direction to said first movement, apparatus for driving the take-up elements which includes a motor; guide means for the horizontal movement of said take-up elements; a mechanical transmission connected between said motor and said take-up elements for driving the horizontal movement thereof, and means for driving the vertical movement, wherein the improvements consist in:

said mechanical transmission between the motor and the take-up elements being constituted by a linkage including gear means defining a crank mechanism driven by the motor and a connecting rod of substantially the same length as the crank mechanism which is articulated at one end to the crank mechanism and at the other end to a part moveable with the take-up elements, and said means for driving the vertical movement of the take-up elements comprise cam means driven by the motor and arranged to operate close to the end of the first horizontal movement to cause a continuous variation in the velocity and acceleration of said take-up elements during the vertical movement, whereby the operation of said motor drives said three movements in succession without intermediate stoppages and with a continuous and substantially harmonic variation in the velocity and acceleration of said take-up elements, and wherein said crank mechanism is constituted by a first gear wheel; a pinion driven by said motor meshes with said first gear wheel; a second gear wheel is carried by said end of the connecting rod articulated to said crank mechanism; a third gear wheel coaxial with said first gear wheel; an auxiliary gear wheel freely rotatable on the said first gear wheel is interposed between said third gear wheel and said second gear wheel, the latter having a diameter of half the diameter of said third gear wheel, and an auxiliary motor is provided for rotating said third gear wheel through a limited angle;

said apparatus also including a further linkage identical to the said linkage and driven in synchronism therewith by said motor, and a coupling element carried by the take-up elements for selectively engaging the free end of the connecting rods of said two linkages according to the side of a frame on which the cycle of movement is to be carried out, the third gear wheel of said further linkage being rotatable through a limited angle in synchronism with the third gear wheel of the other said linkage by means of said auxiliary motor.

* * * * *